(12) United States Patent
Chen

(10) Patent No.: US 8,876,120 B2
(45) Date of Patent: Nov. 4, 2014

(54) CONNECTING ROD ASSEMBLY FOR CONNECTING A WORK HEAD

(76) Inventor: Bo-Shen Chen, Taichung (TW)

( * ) Notice: Subject to any disclaimer, the term of this patent is extended or adjusted under 35 U.S.C. 154(b) by 640 days.

(21) Appl. No.: 13/241,570

(22) Filed: Sep. 23, 2011

(65) Prior Publication Data

US 2013/0001897 A1 Jan. 3, 2013

(30) Foreign Application Priority Data

Jun. 30, 2011 (TW) .............................. 100122999 A

(51) Int. Cl.
| | |
|---|---|
| *B23B 31/22* | (2006.01) |
| *B25B 23/00* | (2006.01) |
| *B23B 31/00* | (2006.01) |
| *B25B 15/00* | (2006.01) |
| *B23B 31/28* | (2006.01) |

(52) U.S. Cl.
CPC ............. *B25B 23/0035* (2013.01); *B23B 31/22* (2013.01); *B23B 31/28* (2013.01); *B23B 31/003* (2013.01); *B25B 15/001* (2013.01); *Y10S 279/905* (2013.01); *Y10S 279/906* (2013.01)
USPC .............. 279/30; 279/75; 279/128; 279/143; 279/155; 279/905; 279/906; 81/438

(58) Field of Classification Search
CPC ...... B23B 31/003; B23B 31/22; B23B 31/28; B23B 31/1071; B25B 23/0035
USPC ......... 279/22, 30, 75, 82, 128, 137, 143, 155, 279/905, 906; 81/177.85, 438
IPC ............................................ B23B 31/22,31/107
See application file for complete search history.

(56) References Cited

U.S. PATENT DOCUMENTS

| | | | | |
|---|---|---|---|---|
| 3,788,658 | A * | 1/1974 | Benjamin et al. ............... | 279/75 |
| 6,457,916 | B2 * | 10/2002 | Wienhold ..................... | 408/240 |
| 6,722,667 | B2 * | 4/2004 | Cantlon ......................... | 279/22 |
| 7,424,841 | B2 * | 9/2008 | Liu ................................ | 81/438 |
| 7,448,302 | B2 * | 11/2008 | Huang .......................... | 81/438 |
| 7,469,909 | B2 * | 12/2008 | Strauch et al. .................. | 279/75 |
| 7,565,854 | B2 * | 7/2009 | Chiang et al. .................. | 81/467 |
| 7,581,470 | B1 * | 9/2009 | Huang .......................... | 81/438 |
| 7,891,275 | B2 * | 2/2011 | Huang .......................... | 81/438 |
| 7,922,180 | B2 * | 4/2011 | Meng ........................... | 279/143 |
| 8,172,236 | B2 * | 5/2012 | Shibata ........................ | 279/143 |
| 8,690,164 | B2 * | 4/2014 | Meng ............................ | 279/75 |
| 2004/0164503 | A1 * | 8/2004 | Fan-Chiang et al. ........... | 279/75 |
| 2007/0108706 | A1 * | 5/2007 | Cornwell et al. ............. | 279/143 |
| 2009/0224492 | A1 * | 9/2009 | Lin ............................... | 279/82 |
| 2012/0326399 | A1 * | 12/2012 | Lin ............................... | 279/75 |
| 2012/0326400 | A1 * | 12/2012 | Lin ............................... | 279/75 |

* cited by examiner

*Primary Examiner* — Eric A Gates
(74) *Attorney, Agent, or Firm* — Banger Shia

(57) ABSTRACT

A connecting rod assembly is capable of pushing the work head outward to allow more of the part of the work head to be exposed out of the connecting rod assembly, making it easier for the user to pull out the work head, thus solving the problem that it is difficult to pull the work head out of the conventional connecting rod structure since the conventional connecting rod structure doesn't have any function or devices to move the work head outwards.

3 Claims, 4 Drawing Sheets

CONNECTING ROD ASSEMBLY FOR CONNECTING A WORK HEAD

BACKGROUND OF THE INVENTION

1. Field of the Invention

The present invention relates to a connecting rod assembly, and more particularly to a connecting rod assembly for quick connecting and releasing a work head.

2. Description of the Prior Art

The operation of screwing and unscrewing screws normally requires the use of a connecting rod which is provided with a replaceable work head at one end thereof, and the other end of the connecting rod is to be clamped and driven to rotate by a pneumatic tool, so that the work head at the end of the connecting rod is rotated to screw or unscrew screws. In order to quickly replace the work head, the connecting rod is usually provided with a quick release unit, pushing or releasing a sleeve of the quick release unit can allow for quick insertion (assembling) or pulling (releasing) of the work head.

To pull out the work head, the user has to grip the part of the work head that exposed out of the connecting rod and then pulls it out. However, the conventional connecting rod doesn't have any function or devices to move the work head outwards, so that it is not easy for the user to grip the work head tight (the exposed part of the work head is too small to grip) sometimes when the work head is inserted too deeply, making it difficult to pull out the work head.

The present invention has arisen to mitigate and/or obviate the afore-described disadvantages.

SUMMARY OF THE INVENTION

The primary object of the present invention is to provide a connecting rod assembly, wherein the work head can be pushed outward to, allow more of the part of the work head to be exposed out of the connecting rod assembly, making it easier for the user to pull out the work head.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
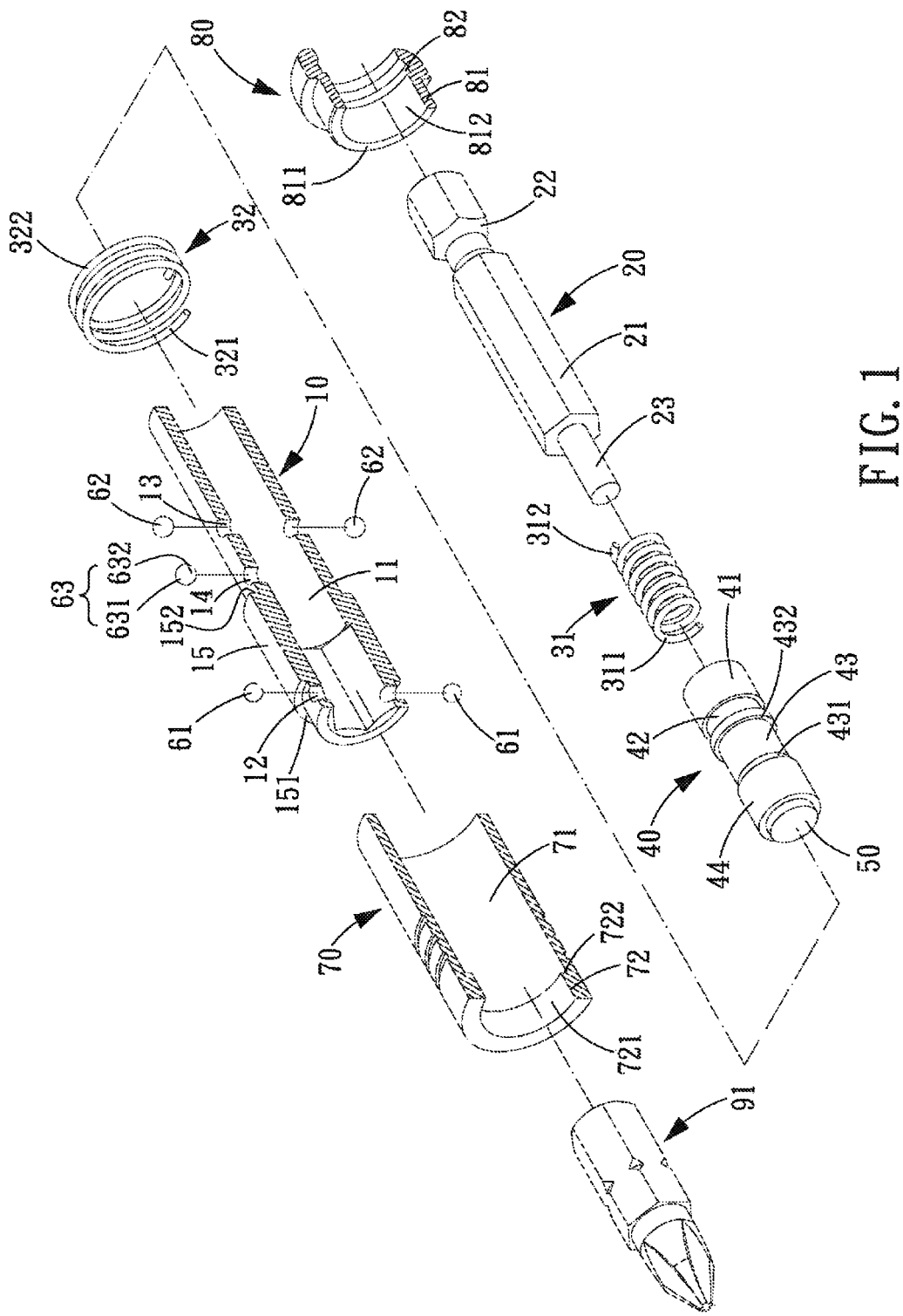
FIG. 1 is an exploded view of a connecting rod assembly and a work head in accordance with the present invention.
Figure 2:
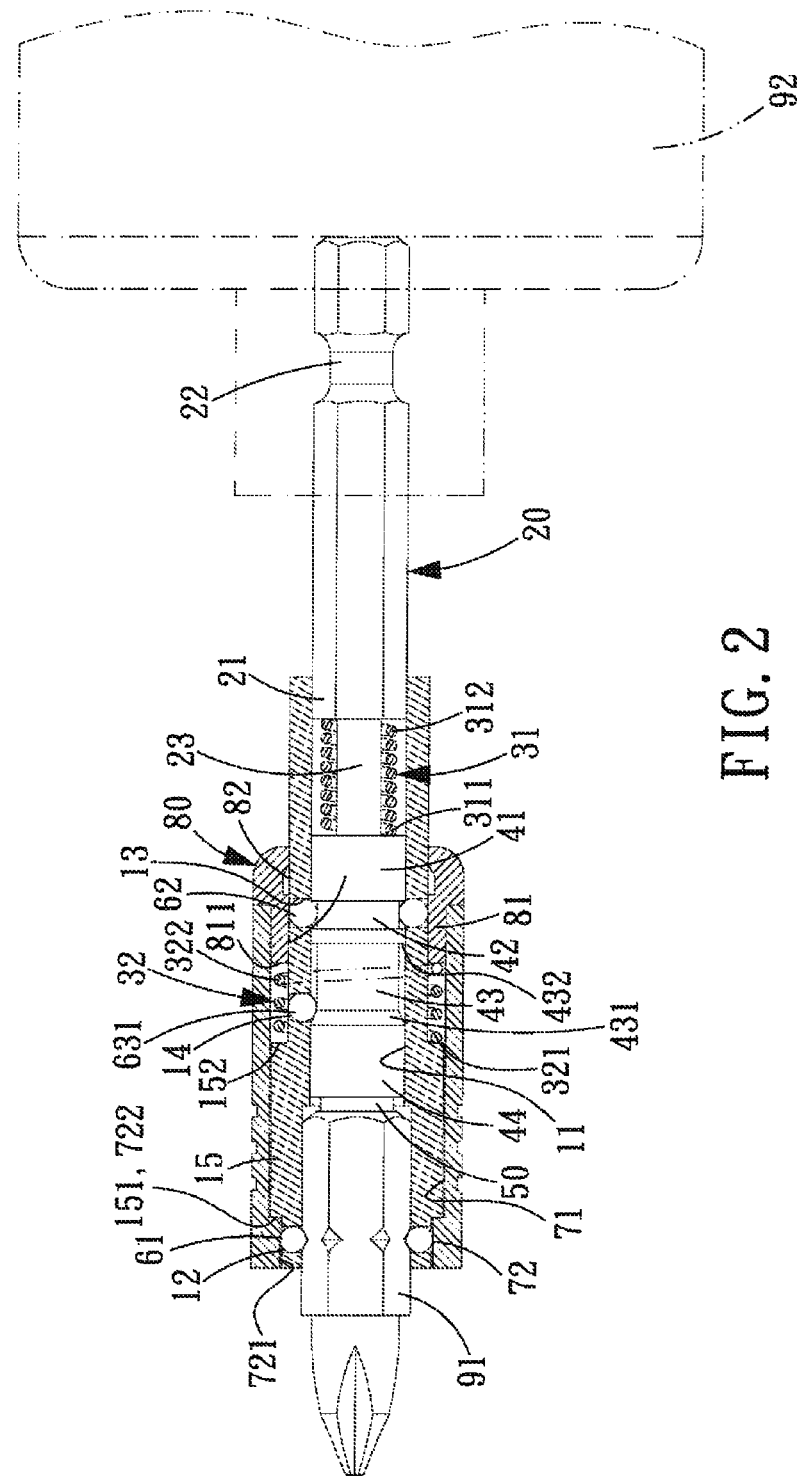
FIG. 2 is a cross sectional view of the connecting rod assembly with a work head in accordance with the present invention.

Referring to FIGS. 1 and 2, a connecting rod assembly in accordance with the present invention is provided for insertion and positioning of a work head 91 and is to be driven by a pneumatic tool 92. The connecting rod assembly comprises a tube 10, a rod 20, an inner spring 31, a link 40, a magnet 50, two first balls 61, two second balls 62, a positioning member 63, an outer spring 32, a sleeve 70 and an annular member 80.

The tube 10 is provided with an axial inner space 11 for insertion of the work head 91, two first holes 12, two second holes 13 and a positioning hole 14 formed in an outer surface of the tube 10 and in communication with the axial inner space 11 in such a manner that the positioning hole 14 is disposed between the two first holes 12 and the two second holes 13, and the first holes 12 are aligned with each other, and so are the second holes 13. An annular protruding portion 15 is formed on the outer surface of the tube 10 and located between the first holes 12 and the positioning hole 14, a first annular surface 151 is formed at one end of the annular protruding portion 15 and located adjacent to the two first holes 12, and a second annular surface 152 is formed adjacent to the second holes 13 and located at another end of the annular protruding portion 15. It is to be noted that the front section of the axial inner space 11 is hexagonal shaped in cross section to receive the work head 91, while the rear section of the axial inner space 11 is circular in cross section for insertion of the link 40 and the rod 20.

The rod 20 includes an engaging portion 21 to be engaged in the axial inner space 11 of the tube 10, a connecting portion 22 to be clamped by the pneumatic tool 92, and an extension portion 23 on which the inner spring 31 is to be mounted. The extension portion 23 and the connecting portion 22 are located at both ends of the rod 20 and the engaging portion 21 is in the middle.

The inner spring 31 is disposed in the axial inner space 11 and has a first end 311 pressed against the engaging portion 21 of the rod 20 and a second end 312.

The link 40 is slidably received in the axial inner space 11 of the tube 10 and includes a first portion 41 to be pressed against the second end of the inner spring 31, an annular positioning groove 42 formed in the first portion 41, an annular restricting groove 43 defined by a first wall 431 and an opposite second wall 432, and a second portion 44. The link 40 is pushed outward with respect to the tube 10 by the inner spring 31.

The magnet 50 is fixed in the second portion 44 of the link 40 and then disposed in the axial inner space 11 of the tube 10 together with the link 40 to position the work head 91 through magnetic attraction.

The first balls 61 are movably disposed in the first holes 12 of the tube 10 to lock or release the work head 91.

The second balls 62 are movably disposed in the second holes 13 of the tube 10 to lock or release the annular positioning groove 42 of the link 40.

The positioning member 63 is a ball which is provided with a positioning portion 631 to be engaged in the positioning hole 14 of the tube 10 and a restricting portion 632 to be disposed between the first and second walls 431, 432 to prevent the link 40 from being pushed to disengage from the tube 10 by the inner spring 31.

The outer spring 32 is mounted on the tube 10 and includes a first end 321 to be pressed against the second annular surface 152 and a second end 322.

Figure 3:
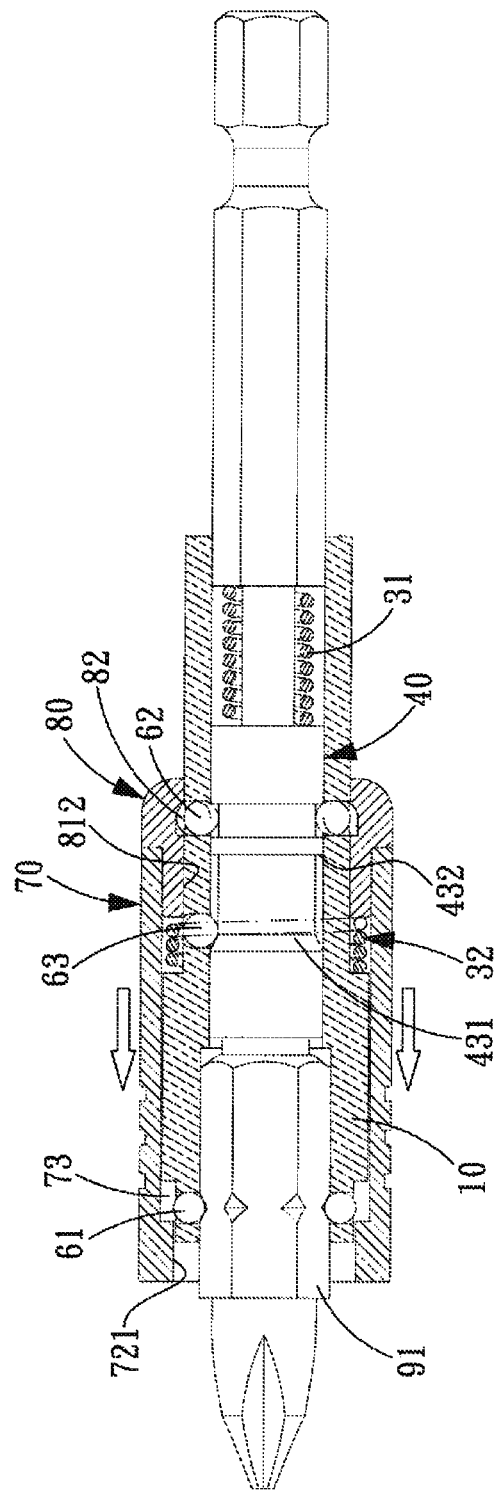
FIG. 3 is an operational view in accordance with the present invention showing that the sleeve is pushed toward the work head.

The sleeve 70 is slidably sleeved onto the tube 10 and formed with an axial inner space 71 and a pressing portion 72 at one end of the axial inner space 71. The pressing portion 72 is formed with an annular pressing surface 721 to press against or disengage from the first balls 61, and a pressing end surface 722 to press against or to move away from the first annular surface 151. When the pressing end surface 722 is disengaged from the first annular surface 151 and the annular pressing surface 721 is not pressed against the first balls 61, an avoiding space 73 will be formed between the sleeve 70 and the tube 10 to receive the first balls 61, as shown in FIG. 3.

The annular member 80 is slidably sleeved on the tube and includes an annular inserting portion 81 to be inserted at another end, of the axial inner space 71 of the sleeve 70, an annular end surface 811 formed on the annular inserting portion 81 and to be pressed against the second end 322 of the outer spring 32, an annular pressing surface 812 serving to press against or disengage from the second balls 62, and a receiving groove 82 for reception of the second balls 62.

The abovementioned are the structural relations of the main components of the present invention, and the operation and effect of the embodiment of the present invention are described as follows.

As shown in FIG. 2, the work head 91 is inserted in the axial inner space 11 of the tube 10 and positioned therein by the engagement of the first balls 61 and the magnetic attraction of the magnet 50. Meanwhile, the link 40 is pushed inwards by the work head 91 to compress the inner spring 31 in such a manner that the annular positioning groove 42 of the link 40 is engaged with the second balls 62 to hold (position) the link 40, and thus the rod 20 is kept in a work position.

Figure 4:
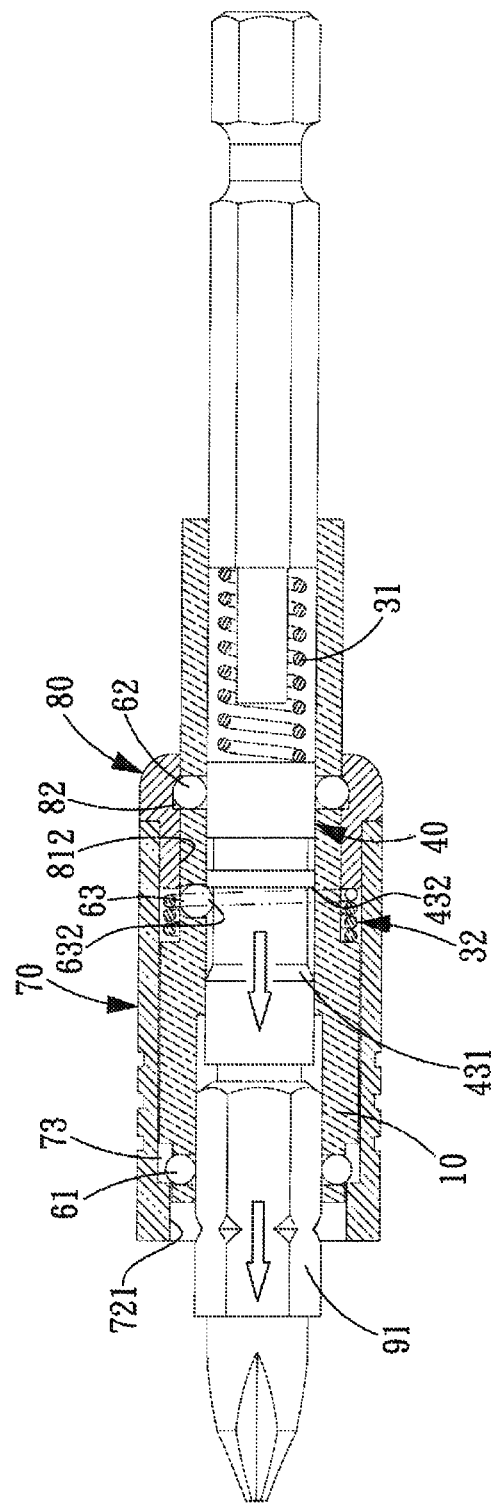
FIG. 4 is another operational view in accordance with the present invention showing that the inner spring pushes the link and the work head toward the tube.

Referring then to FIGS. 3 and 4, to pull out the work head 91, the sleeve 70 is pushed a certain distance toward the work head 91, so that the annular member 80 is pushed by the sleeve 70 to compress the outer spring 32. Meanwhile, the second balls 62 disengage from the annular pressing surface 812 and engage with the receiving groove 82. Furthermore, the first balls 61 disengage from the annular pressing surface 721 of the sleeve 70 and engage in the avoid space 73 after the sleeve 70 is pushed toward the work head 91. At this moment, since the first and second balls 61, 62 are released from being pressed by the annular pressing surfaces 721, 812 respectively; the inner spring 31 is decompressed to push the link 40 and the work head 91 to move out of the tube 10 until the second wall 432 of the link 40 is stopped against the restricting portion 632 of the positioning member 63, as shown in FIG. 4. At this moment, the second balls 62 will be pushed by the first portion 41 of the link 40 to move into the receiving groove 82 of the annular member 80. Before the link 40 is pushed inward and the second balls 60 are still engaged in the annular positioning groove 42, the sleeve 70 is maintained in its after-being-pushed position. The distance that the work head 91 is pushed outward equals the distance between the first and second walls 431, 432 of the link 40. By such arrangements, the work head 91 can be pushed outward to allow more of the area of the work head to be exposed out of the connecting rod assembly, making it easier for the user to pull out the work head 91. After the work head 91 is pulled out and replaced with a new work head, the new work head pushes the link 40 inwards to decompress the outer spring 32, thus returning the rod 20 back to its work position.

While we have shown and described various embodiments in accordance with the present invention, it is clear to those skilled in the art that further embodiments may be made without departing from the scope of the present invention.

What is claimed is:

1. A connecting rod assembly for connecting a work head, comprising: a tube provided with an axial inner space for insertion of the work head, a first hole, a second hole and a positioning hole formed in an outer surface of the tube and in communication with the axial inner space in such a manner that the positioning hole is disposed between the first and second holes, an annular protruding portion formed on the outer surface of the tube and located between the first hole and the positioning hole, a first annular surface formed at one end of the annular protruding portion and located adjacent to the first hole, and a second annular surface formed adjacent to the second hole and located at another end of the annular protruding portion; a rod including an engaging portion to be engaged in the axial inner space of the tube and a connecting portion to be clamped by a pneumatic tool; an inner spring disposed in the axial inner space and having a first end pressed against the engaging portion of the rod and a second end; a link slidably received in the axial inner space of the tube and including a first portion to be pressed against the second end of the inner spring, an annular positioning groove formed in the first portion, an annular restricting groove defined by a first wall and an opposite second wall, and a second portion; a magnet fixed in the second portion of the link and then disposed in the axial inner space of the tube; a first ball movably disposed in the first hole of the tube to lock or release the work head; a second ball movably disposed in the second hole of the tube to lock or release the annular positioning groove of the link; a positioning member provide with a positioning portion to be engaged in the positioning hole of the tube and a restricting portion to be disposed between the first and second walls; an outer spring mounted on the tube and including a first end to be pressed against the second annular surface, and a second end; a sleeve slidably sleeved onto the tube and formed with an axial inner space and a pressing portion at one end of the axial inner space, the pressing portion being formed with an annular pressing surface to press against or disengage from the first ball, and a pressing end surface to press against or to move away from the first annular surface, when the pressing end surface is disengaged from the first annular surface and the annular pressing surface is not pressed against the first ball, an avoiding space will be formed between the sleeve and the tube to receive the first ball; an annular member slidably sleeved on the tube and including an annular inserting portion to be inserted at another end of the axial inner space of the sleeve, an annular end surface formed on the annular inserting portion and to be pressed against the second end of the outer spring, an annular pressing surface serving to press against or disengage from the second ball, and a receiving groove for reception of the second ball.

2. The connecting rod assembly for connecting a work head as claimed in claim 1, wherein the positioning member is a ball.

3. The connecting rod assembly for connecting a work head as claimed in claim 1, wherein the rod includes an extension portion on which the inner spring is to be mounted.

* * * * *